(12) United States Patent
Cudak et al.

(10) Patent No.: US 10,810,212 B2
(45) Date of Patent: Oct. 20, 2020

(54) VALIDATING PROVIDED INFORMATION IN A CONVERSATION

(71) Applicant: LENOVO Enterprise Solutions (Singapore) PTE. LTD., New Tech Park (SG)

(72) Inventors: Gary D. Cudak, Wake Forest, NC (US); Nathan J. Peterson, Durham, NC (US); Amy L. Rose, Chapel Hill, NC (US); Bryan L. Young, Tualatin, OR (US); Jennifer J. Lee-Baron, Morrisville, NC (US); John S. Crowe, Durham, NC (US)

( * ) Notice: Subject to any disclaimer, the term of this patent is extended or adjusted under 35 U.S.C. 154(b) by 743 days.

(21) Appl. No.: 15/224,394

(22) Filed: Jul. 29, 2016

(65) Prior Publication Data
US 2018/0032526 A1 Feb. 1, 2018

(51) Int. Cl.
| | |
|---|---|
| *G06F 16/2457* | (2019.01) |
| *H04L 29/06* | (2006.01) |
| *G06Q 10/10* | (2012.01) |
| *G06Q 50/00* | (2012.01) |
| *H04M 3/42* | (2006.01) |

(Continued)

(52) U.S. Cl.
CPC ...... *G06F 16/24578* (2019.01); *G06F 16/248* (2019.01); *G06Q 10/10* (2013.01); *G06Q 50/01* (2013.01); *G10L 17/22* (2013.01); *H04L 63/123* (2013.01); *H04L 63/1441* (2013.01); *H04M 3/42042* (2013.01); *H04M 2201/41* (2013.01); *H04M 2203/6054* (2013.01)

(58) Field of Classification Search
CPC ................................. G06F 16/24578
See application file for complete search history.

(56) References Cited

U.S. PATENT DOCUMENTS

| | | | |
|---|---|---|---|
| 6,804,332 B1 * | 10/2004 | Miner ............ | H04M 3/42 379/88.13 |
| 2003/0182119 A1 * | 9/2003 | Junqua ............ | G10L 15/24 704/246 |

(Continued)

OTHER PUBLICATIONS

Yanan Wang, "Warn your grandmother: Alleged multimillion scam preys on kind-hearted elderly", https://www.washingtonpost.com/news/morning-mix/wp/2015/11/04/canadian-man-to-be-arraigned-in-florida-for-elaborate-multimillion-dollar-grandmother-scam/, Last visited Jul. 26, 2016.

(Continued)

*Primary Examiner* — Dawaune A Conyers
(74) *Attorney, Agent, or Firm* — Kunzler Bean & Adamson; Bruce R. Needham

(57) ABSTRACT

For validating information provided in a conversation, apparatus, methods, and program products are disclosed. The apparatus includes an association module that associates a plurality of items of caller identification data with a caller, an information module that identifies, using a speech recognition application, caller information from speech of the caller during a telephonic conversation with a call recipient, a comparison module that compares the plurality of items of caller identification data with the caller information, and a validation module that calculates a confidence score based on the comparison of the plurality of items of caller identification data with the caller information and presents, to the call recipient, the confidence score.

18 Claims, 6 Drawing Sheets

(51) Int. Cl.
*G10L 17/22* (2013.01)
*G06F 16/248* (2019.01)

(56) References Cited

U.S. PATENT DOCUMENTS

| | | | | |
|---|---|---|---|---|
| 2007/0071206 A1* | 3/2007 | Gainsboro | .......... | H04M 3/2281 |
| | | | | 379/168 |
| 2013/0308764 A1* | 11/2013 | Abuelsaad | .......... | H04L 12/1818 |
| | | | | 379/93.01 |
| 2014/0254778 A1* | 9/2014 | Zeppenfeld | .......... | H04M 3/523 |
| | | | | 379/88.02 |
| 2015/0003599 A1* | 1/2015 | Brunn | ................ | H04L 65/1069 |
| | | | | 379/142.04 |
| 2015/0065087 A1* | 3/2015 | Cudak | .................. | H04W 12/08 |
| | | | | 455/411 |
| 2016/0036969 A1* | 2/2016 | Kau | .................. | H04M 3/42221 |
| | | | | 379/85 |
| 2016/0104480 A1* | 4/2016 | Sharifi | ................... | G10L 15/08 |
| | | | | 704/254 |

OTHER PUBLICATIONS

Matt Anthony, "Pindrop Security Blog," https://www.pindropsecurity.com/secure-phone-transactions//, Last visited Jul. 26, 2016.
Caller ID, https://www.truecaller.com/caller-id, Last visited Jul. 26, 2016.
Eileen Brown, "Crowdsourced phone book stamps out spam calls," http://www.zdnet.com/article/crowdsourced-phone-book-stamps-out-spa/, Last visited May 4, 2016.
Blog post, "Re: [cnit] [stir] Reputation vs Display name (was Textual caller ID)," http://www.ietf.org/mail-archive/web/cnit/current/msg00002.html, Last visited Jul. 26, 2016.

* cited by examiner

VALIDATING PROVIDED INFORMATION IN A CONVERSATION

FIELD

The subject matter disclosed herein relates to validation and more particularly relates to validation of an identity during a conversation.

BACKGROUND

Description of the Related Art

Caller ID is vulnerable as it an easily spoofable technique. The phone call is being used increasingly by attackers. Further, attackers use psychological manipulation in impersonating a trusted individual through revealing personal information of the individual. Attackers are leveraging this and causing millions in losses.

BRIEF SUMMARY

An apparatus for validating information provided in a conversation is disclosed. A method and computer program product also perform the functions of the apparatus. The apparatus for validating information provided in a conversation includes an association module that associates a plurality of items of caller identification data with a caller, and an information module that identifies, using a speech recognition application, caller information from speech of the caller during a telephonic conversation with a call recipient. The apparatus includes a comparison module that compares the plurality of items of caller identification data with the caller information, and a validation module that calculates a confidence score based on the comparison of the plurality of items of caller identification data with the caller information and presents, to the call recipient, the confidence score.

In some embodiments, matches between items of the caller identification data and the caller information improve the confidence score and non-matches between items of the caller identification data and the caller information worsen the confidence score. In one embodiment, matches between caller information and items of caller identification data corroborated by more than one source improve the confidence score by a greater amount than matches between caller information and uncorroborated caller identification data. In certain embodiments, the apparatus further includes a score weight module that assigns different weights to different types of caller information. Matches between items of caller identification data and caller information with a greater weight improves the confidence score by a greater amount than matches between items of caller identification data and caller information with a lesser weight.

In some embodiments, presenting the confidence score to the call recipient includes outputting an audio message audible to the call recipient and inaudible to the caller. In one embodiment, presenting the confidence score to the call recipient includes providing an indicator for specific pieces of caller information. In another embodiment, identifying caller information includes identifying a contact of the call recipient referenced by the caller during the call, and the apparatus also includes a contacts module that queries a device of the identified contact for information regarding the caller, where the validation module further calculates the confidence score based on a response to the query. In certain embodiments, the apparatus includes a voiceprint module that captures voiceprint data of the caller. In the embodiment, the query for information regarding the caller includes a query for contact-generated voiceprint data of the caller, the comparison module compares the captured voiceprint data with the contact-generated voiceprint data, and the validation module calculates the confidence score based in part on the voiceprint data comparison.

In one embodiment, associating a plurality of items of caller identification data with a caller includes the association module retrieving information from a social network profile of the caller. In another embodiment, associating a plurality of items of caller identification data with a caller includes the association module querying a plurality of data sources for caller identification data of the caller. In a further embodiment, at least one of the plurality of data sources is independent of data sources controlled by the caller.

In some embodiments, the association module searches the internet to identify the plurality of items of caller identification data. In certain embodiments, associating a plurality of items of caller identification data with a caller includes the association module querying an employee directory of a business identified, using a speech recognition application, from speech of the caller.

The method for validating information provided in a conversation includes associating, by use of a processor, a plurality of items of caller identification data with a caller, and identifying, using a speech recognition application, caller information from speech of the caller during a telephonic conversation with a call recipient. The method includes comparing the plurality of items of caller identification data with the caller information, calculating a confidence score based on the comparison of the plurality of items of caller identification data with the caller information, and presenting, to the call recipient via an electronic device, the confidence score.

In some embodiments, matches between items of the caller identification data and the caller information improve the confidence score and non-matches between items of the caller identification data and the caller information worsen the confidence score. In one embodiment, identifying caller information includes identifying a contact of the call recipient referenced by the caller during the call, and the method also includes querying a device of the identified contact for information regarding the caller, wherein calculating the confidence score includes calculating the confidence score based on a response to the query. In such embodiments, the method includes capturing voiceprint data of the caller, where the query for information regarding the caller includes a query for contact-generated voiceprint data of the caller, and comparing the captured voiceprint data with the contact-generated voiceprint data, where calculating the confidence score is also based on the voiceprint data comparison.

In one embodiment, associating a plurality of items of caller identification data with a caller includes querying a plurality of data sources for caller identification data of the caller. At least one of the plurality of data sources is independent of data sources controlled by the caller.

A program product for validating information provided in a conversation includes a computer readable storage medium that stores code executable by a processor. The executable code includes code to perform: associating a plurality of items of caller identification data with a caller, identifying, using a speech recognition application, caller information from speech of the caller during a telephonic conversation with a call recipient, comparing the plurality of items of caller identification data with the caller information, calculating a confidence score based on the comparison of the plurality of items of caller identification data with the caller information, and presenting, to the call recipient via an electronic device, the confidence score.

In one embodiment, presenting the confidence score to the call recipient includes outputting an audio message via the electronic device, the audio message being audible to the call recipient and inaudible to the caller.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
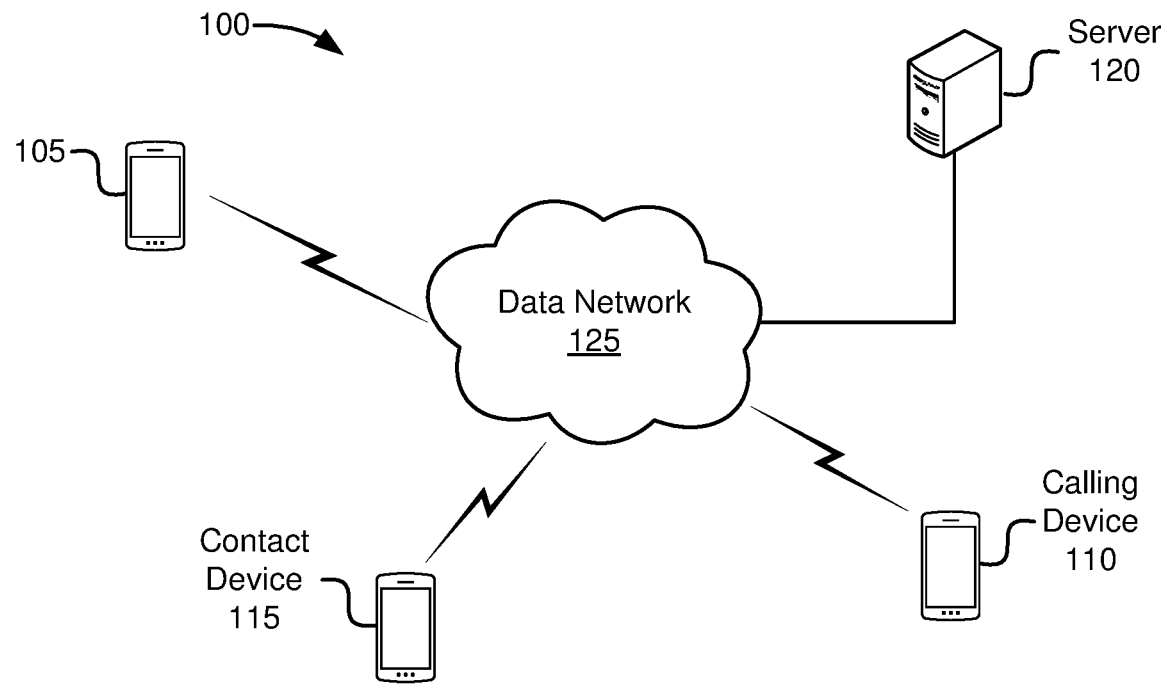
FIG. 1A is a schematic block diagram illustrating one embodiment of a system for validating information provided in a conversation.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes, systems, methods, apparatus, and computer program products for validating information provided in a conversation by matching information provided by a caller to provide a level of confidence rating of the caller to the caller recipient. The information provided by the caller may be captured automatically, e.g., via a voice recognition function, and compared to data about the caller stored in the call recipient's device, a crowd-sourced database, public records, employee directories, and the like. Relevant data provided by the caller may include name, location, relationship, acquaintances or contacts, biographical stored information (e.g., information pertaining to the presented name/alias), place of employment, affiliations (e.g., mutual acquaintances or group membership), and the like.

The confidence score may be determined based on a matching level or ratio of the information provided against confirmed information. Additionally, or alternatively, the confidence score may be based on potential correlate of links to user via social groups or known dealings (e.g., banks, accounts, utilities, and the like). After determining the confidence score, the call recipient's device may provide a confidence score during the conversation. Such a presentation may represent potential links to the caller and/or the validity of data provided by the caller. While discussed in context of a phone call (e.g., voice call), the disclosure is equally applicable to video calls or text-based conversations (e.g., email conversations, text messaging conversations, and the like). Additionally, the described systems, apparatus, and methods may be used to validate provided information in an off-line conversation between a speaker (orator) and a user.

FIG. 1A depicts a system 100 for validating information provided in a conversation, according to embodiments of the disclosure. The system 100 includes an electronic device 105 of the call recipient that receives a call (e.g., voice or video call) from a caller via a calling device 110, at least one contact device 115, at least one data source 120, and a data network 125. The electronic device 105, the calling device 110, the contact device 115, and the data source 120 may communicate over the data network 125 using any known network communication protocols including, but not limited to transmission control protocol and Internet protocol ("TCP/IP"), Ethernet protocol, IEEE 802 protocols, GSM/UMTS/LTE wireless communication protocols, and the like.

The electronic device 105 may be any suitable computing device including, but not limited to, a telephone, a smart phone, a tablet computer, a laptop computer, a personal computer, and the like. Likewise, the calling device 110 may be a telephone, a smartphone, a tablet computer, an automatic dialer, a desktop computer, a laptop computer, a personal computer, a server (e.g., telephony server), and the like. The electronic device 105 and the calling device 110 may be communicatively connected via the data network 125.

The system 100 also includes at least one contact device 115, which is an electronic device of a contact (e.g., friend, relation, etc.) of the electronic device 105. In one embodiment, the contact device 115 may be a telephone (e.g., a smart phone), a mobile computer (e.g., a smart phone, tablet computer, personal digital assistant ("PDA"), or laptop computer), a personal computer, (e.g., laptop, tablet, or desktop computer), or the like. The electronic device 105 and the at least one contact device 115 may be communicatively connected via the data network 125.

The system 100 also includes at least one data source 120 (e.g., a data server) that stores data relating to information provided by the caller, as discussed in greater detail below. A data source 120 may be a computing device storing caller identification data. Examples of data source 120 computing devices include, but are not limited to, a server, a mainframe, a personal computer, and the like. A data source 120 may also be a database or other data structure stored on a server, computing device, etc. In one embodiment, the data source 120 may be a server or database storing a user account, a contact list, a call history, or other call-related data of a contact (e.g., friend, relation, etc.) of the electronic device 105. The electronic device 105 and the at least one data source 120 may be communicatively connected via the data network 125.

The data network 125 facilitates the exchange of information between the electronic device 105 and the calling device 110, the contact device 115, and/or the data source 120. The data network 125 may be a wired network, a wireless network, or may include both wired and wireless networks. Examples of the data network 125 include, but are not limited to, the Internet (e.g., the World Wide Web ("WWW")), a mobile telecommunication network (e.g., a cellular telephone network), a local area network, a wide-area network, a public switched telephone network ("PTSN"), and combinations thereof. The data network 125 may include a plurality of network nodes, including, but not limited to, routers, switches, repeaters, network bridges, and the like. In one embodiment, each of the electronic device 105, the calling device 110, the contact device 115, and the data source 120 includes a network interface for communicating over the data network 125. In one embodiment, the electronic device 105, the calling device 110, the contact device 115, and/or the data source 120 connects to the data network 125 using a wireless connection.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

A caller initiates a phone call (or other communication) with the electronic device 105 via the calling device 110. In certain embodiments, calling device 110 may be associated with call information, such as a telephone number, an IP address, and the like. Additionally, during the conversation with a user of the electronic device 105, the caller may provide (e.g., speak) via the calling device 110 several pieces of caller information usable to identify the caller.

The contact device 115 may receive queries from the electronic device 105 and respond to the same. In one embodiment, the contact device 115 belongs to a contact of the user of the electronic device 105, for example an individual listed in a contact list stored on the electronic device 105. As described herein, the contact device 115 may be a source for providing caller identification data used by the electronic device 105 to validate information provided in a conversation with the caller. The caller identification data may relate to the caller and/or to the calling device 110.

Similarly, the data source 120 may be any network-accessible data repository storing caller identification data usable by the electronic device 105 to validate information provided in a conversation with the caller. In one embodiment, the data source 120 may be crowd-sourced. As used herein, a crowd-sourced data source 120 is one in which a plurality of users contribute caller identification data. The user of the electronic device 105 may be affiliated with (e.g., be a member of) an organization providing the crowd-sourced data source 120. In another embodiment, the data source 120 may be provided by a trusted third-party.

The electronic device 105 is used to associate a plurality of items of caller identification data with the caller. The electronic device 105 may further identify print using a speech recognition application) caller information from speech of the caller during a telephonic conversation with a call recipient (e.g., a user of the electronic device 105) via the calling device 110 and the electronic device 105. The electronic device 105 compares the plurality of items of caller identification data with the caller information and generates a confidence score based on the comparison. Additionally, the electronic device 105 communicates the confidence score to the call recipient. The electronic device 105 discussed in further detail below.

Figure 1B:
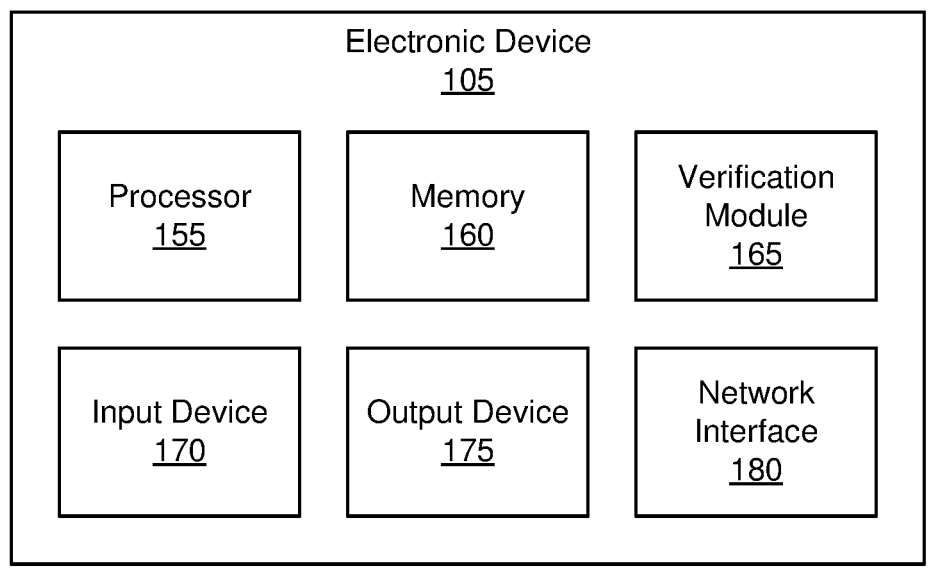
FIG. 1B is a schematic block diagram illustrating one embodiment of an electronic device used in the system of FIG. 1A.

FIG. 1B depicts a block diagram of the electronic device 105 belonging to a call recipient. As depicted, the electronic device 105 includes a processor 155, a memory 160, a verification module 165, an input device 170, an output device 175, and a network interface 180. The electronic device 105 may be any suitable computing device including, but not limited to, a telephone, a smart phone, a tablet computer, a laptop computer, a personal computer, and the like. In one embodiment, the electronic device 105 may include one or more remote (e.g., external) components. For example, the electronic device 105 may include a remote handset having one instance of an input device 170 and an output device 175, the remote handset being physically separate from and communicatively coupled to the rest of the electronic device 105.

The processor 155, in one embodiment, may comprise any known controller capable of executing computer-readable instructions and/or capable of performing logical operations. For example, the processor 155 may be a microcontroller, a microprocessor, a central processing unit (CPU), a graphics processing unit (GPU), an auxiliary processing unit, a FPGA, an integrated circuit, or similar controller. In certain embodiments, the processor 155 may include a plurality of processing units, such as a plurality processing cores, a plurality of CPUs, a plurality of microcontrollers, or the like. In some embodiments, the processor 155 executes instructions stored in the memory 160 to perform the methods and routines described herein. The processor 155 is communicatively coupled to the memory 160, the verification module 165, the input device 170, the output device 175, and the network interface 180.

The memory 160, in one embodiment, is a computer readable storage medium. In some embodiments, the memory 160 includes volatile computer storage media. For example, the memory 160 may include a random access memory (RAM), including dynamic RAM (DRAM), synchronous dynamic RAM (SDRAM), and/or static RAM (SRAM). In some embodiments, the memory 160 includes non-volatile computer storage media. For example, the memory 160 may include a hard disk drive, a flash memory, or any other suitable non-volatile computer storage device. In some embodiments, the memory 160 includes both volatile and non-volatile computer storage media.

In some embodiments, the memory 160 stores additional data relating to validating information provided in a conversation. For example, the memory 160 may store a contacts data, caller-provided information, a voiceprint data, reference data, and the like. In some embodiments, the memory 160 also stores program code and related data, such as a speech recognition software application and an operating system or other controller algorithms operating on the electronic device 105.

The input device 170, in one embodiment, may comprise any known computer input device including a touch panel, a button, a keyboard, and the like. The input device 170 is configured to receive input from a user, for example touch input, key press input, and the like. In certain embodiments, the input device 170 may include a microphone or other suitable device for receiving voice input from the user. For example, the user may speak one or more commands, wherein input device 170 receives the one or more commands as voice input. In addition, the input device 170 may capture information spoken by a caller (e.g., transmitted via the calling device 110), as discussed below in further detail.

In one embodiment, the input device 170 includes a touch-sensitive portion, such as a touch-sensitive input panel, configured to receive touch input from the user, such as an input gesture. In some embodiments, at least the touch-sensitive portion of the input device 170 may be integrated with the output device 175, for instance as a touchscreen or similar touch-sensitive display.

The output device 175, in one embodiment, may comprise any known electronic display capable of outputting visual data to a user. In some embodiments, the output device 175 includes one or more speakers capable of outputting audible data (e.g., speech) to the user. For example, the output device 175 may be an LCD display, an LED display, an OLED display, a projector, or similar display device capable of outputting images, text, characters, and the like to a user. The output device 175 may display a user interface, such as a graphical user interface (GUI). In one embodiment, the user interface may include one or more windows.

In some embodiments, the output device 175 may be integrated with at least a portion of the input device 170. For example, the output device 175 and a touch panel of the input device 170 may be combined to form a touchscreen or similar touch-sensitive display. As another example, a microphone of the input device 170 and a speaker of the output device 175 may be combined to form a handset, a headset, and/or a headphone. The output device 175 may receive data (e.g., audio and/or visual data) for presentation from the processor 155, the memory 160, and/or the verification module 165.

The network interface 180, in one embodiment, is configured to communicate with one or more external modules, computers, data repositories, or other nodes via the data network 125. In one embodiment, one or more queries may be transmitted by the electronic device 105 and responses received via the network interface 180. In a further embodiment, data may be transmitted and/or received via the network interface 180, including user data, voiceprint data, caller-provided information, reference data, and the like. The network interface 180 may comprise communication hardware and/or communication software, in order to communicate over the data network 125 using wired and/or wireless communication links.

The verification module 165, in one embodiment, identifies (e.g., using a speech recognition application) caller information and speech of the caller during a telephonic (e.g., voice or video) conversation with the call recipient. The verification module 165 associates a plurality of items of caller identification data with the caller. The verification module 165 compares a plurality of items of caller identification data with the identified caller information. Based on the comparison, the verification module 165 calculates a confidence score and presents the confidence score to the call recipient via the electronic device 105. The verification module 165 may be embodied as hardware circuitry, software code, and/or a combination of hardware circuitry and software code. The verification module 165 is discussed in further detail below with reference to the apparatuses 200, 300 of FIGS. 2 and 3.

Additionally, the verification module 165 may be used to verify an off-line conversation between the user of the electronic device 105 and an orator (e.g., an individual speaking aloud to the user, but not having a telephone call, video call, or electronic conversation through the electronic device 105). Here, the electronic device 105 may record the conversation and the verification module 165 may identify, using a speech recognition application, caller information from speech of the orator during the off-line conversation. The verification module 165 may then compare caller identification data with the identified caller information and calculate/present a confidence score, as discussed herein.

As depicted in FIG. 1, the electronic device 105 is able to access information from multiple sources (e.g., contact device 115 and/or data source 120) to validate information provided by a caller. For example, information provided by the caller may be compared to caller identification data (e.g., reference data), which may include crowd-sourced data (e.g., from among a social group or contacts of the call recipient), locally stored user data, user data received from the contact device 115 (e.g., via a sharing service), public domain information, and fingerprint data, such as a voice-print data. The electronic device 105 captures the caller information from speech of the caller (e.g., using a speech recognition application) and automatically generates search queries to acquire the caller identification data. Additionally, the caller information itself may suggest possible sources for validation. For example, if the caller purports to work for particular company, that company's employee directory may be searched for caller identification data.

After comparing the caller identification data to the caller-provided information, the electronic device 105 calculates a confidence score. The confidence score may vary based on results for more than one location. For example, a data point verified by multiple sources may improve the confidence score by a greater amount than a data point verified by a single source. Similarly, a data point refuted by multiple sources may worsen the confidence score by a greater amount than a data point refuted by a single source. Additionally, different types of data may affect the confidence score differently (e.g., being scored on different scales). For example, an incorrect name (e.g., an unverifiable and/or refuted name) may worsen the score by 15% if incorrect, but not affect the score if correct. As another example, a reference to employment may worsen the score by 5% if unverifiable and worsen the score by 10% if refuted (e.g., confirmed incorrect).

The confidence score is to provide an indicator of confidence to the call recipient. In one embodiment, the confidence score provides an overall indicator of confidence (e.g., based on the totality of all comparative data). In another embodiment, an individual confidence score is provided for specific pieces of information. Additionally, the electronic device 105 may store values for specific person over time, to further enhance confidence value of any information provided.

Figure 2:
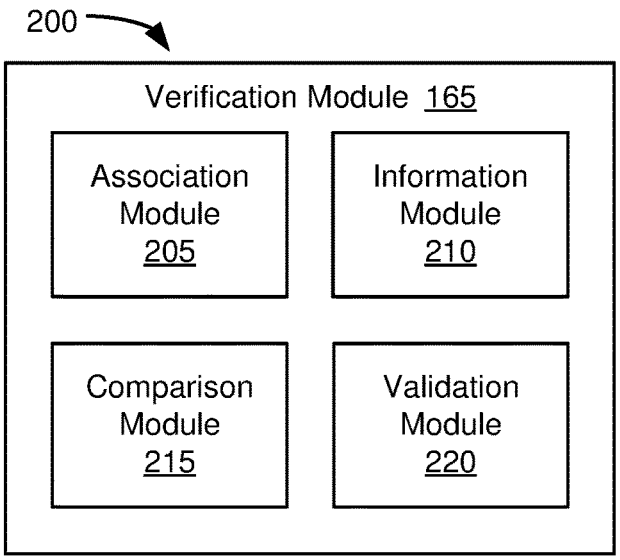
FIG. 2 is a schematic block diagram illustrating one embodiment of an apparatus for validating information provided in a conversation.

FIG. 2 is a schematic block diagram illustrating an apparatus 200 for validating information provided in a conversation, according to embodiments of the disclosure. The apparatus 200 includes one embodiment of a verification module 165, which may be one embodiment of the verification module 165 described above with reference to FIG. 1. The verification module 165 includes an association module 205, an information module 210, a comparison module 215, and a validation module 220. The modules 205-220 may be communicatively coupled to one another. The verification module 165 may comprise hardware circuits, program code operating on a processing device, or a combination of hardware circuitry and program code. In certain embodiments, the modules 205-220 are located within the electronic device 105. In one embodiment, one or more of the modules 205-220 may be physically distributed with some of the module 205-220 being located apart from the electronic device 105. For example, the electronic device 150 may be a telephone handset and one or more of the association module 205, an information module 210, a comparison module 215, and a validation module 220 may be located in a server connected to the telephone handset.

The association module 205, in one embodiment, associates a plurality of items of caller identification data with a caller (e.g., the user of the calling device 110). As used herein, "caller identification data" refers to data used to ascertain the true identity of the caller. Caller identification data is thus distinct from the caller-provided information, referred to herein as "caller information." Accordingly, the caller provides (volunteers) the caller information while the verification module 165 uses the caller identification data to generate a confidence score, thereby verifying whether the caller is being truthful in providing the caller information.

In one embodiment, the caller identification data is stored in a plurality of information sources, including the call recipient's device (e.g., the electronic device 105), the data source 120, and/or the device contact device 115. Further, the association module 205 may retrieve caller identification data from one or more sources so that the verification module 165 is able to confirm or refute the caller information. In some embodiments, the association module 205 performs an Internet search to locate one or more data sources, such as a data source 120 storing caller identification data.

In certain embodiments, the association module 205 queries a plurality of data sources for caller identification data, where at least one of the plurality of data sources is independent of data sources controlled by the caller. For example, if the caller gives a name, the association module 205 may search for caller identification data regarding the named individual/entity from at least one data source not controllable by the caller. Data sources not controllable by the caller may include an employee directory of an employer other than the caller, government records, background-check records, and other data sources outside the control of the caller. Data sources controlled by the caller may include a device used by the caller (e.g., the calling device 110), a database operated by the caller, a user profile created/controlled by the caller, and the like. In certain embodiments, a publicly available and freely editable data source (e.g., where the data within the data source can be edited members of the public) may be considered a data source control by the caller.

In one embodiment, the association module 205 retrieves information from a social network profile of the caller. Retrieving information from the social network profile the caller may include searching a specific social network for information of an entity/individual having a name included in the caller information. Where multiple social network profiles correspond to the entity/individual name, each social network profile may be considered a different data source.

In one embodiment, the association module 205 retrieves information from an electronic device belonging to a contact of the call recipient (e.g., from the contact device 115). For example, the association module 205 may query the contact device 115 for information (e.g., caller identification data) it may have regarding the caller. In another embodiment, the association module 205 may query an employee directory of a business purportedly associated with the caller. For example, the caller may claim to be part of business X, and association module 205 may query an employee directory of business X for information (e.g., caller identification data) regarding the caller.

Additionally, the association module 205 may retrieve caller identification (e.g., "CallerID") information for the caller, such as a phone number used by the calling device 110, a network location (e.g., IP address) of the calling device 110, and other data associated with the telephone call (e.g., the connection between the electronic device 105 and the calling device 110). Still further, the association module 205 may retrieve expected caller identification information based on the provided caller information. For example, that the caller says they are calling from a specific insurance company, the association module 205 may identify telephone numbers known to belong to the insurance company, network locations known to belong to the insurance company, and other call-related data expected from calls originating from the insurance company. The association module 205 may be embodied as hardware circuitry, software code, and/or a combination of hardware circuitry and software code.

The information module 210, in one embodiment, identifies, using a speech recognition application, caller information from speech of the caller during a telephonic conversation with a call recipient. Additionally and/or alternatively, the information module 210 may identify information from a text conversation between the caller recipient (e.g., facilitated using the electronic device 105) and the caller. As discussed above, caller information refers to information provided by the caller relating to the identity of the caller. For example, caller information may include a name, a mutual acquaintance, affiliation with a business organization, a location of the caller (and/or calling device 110), and the like. In certain embodiments, the information module 210 acquires voiceprint data belonging to the caller. Voiceprint data is discussed in further detail with reference to FIG. 3.

In some embodiments, the information module 210 identifies caller information by identifying names or other proper nouns in the conversation. In certain embodiments, the information module 210 identifies caller information by recognizing specific phrases spoken during the conversation (e.g., "my name is . . . ," "I work for . . . ," I work with . . . ," etc.). In one embodiment, the information module 210 contains a list of predetermined types of caller information, and monitors the conversation for caller information belonging to a predetermined type (e.g., name, location, business/organization affiliation, etc.). In another embodiment, the information module 210 uses natural language processing to determine (in real-time) whether spoken information by the caller is caller information (e.g., relating to the identity of the caller).

In one embodiment, the information module 210 compares spoken names to contacts, friends, connections, or other known acquaintances of the call recipient in order to identify an individual referenced by the caller during the call that is known to the call recipient. In some embodiments, the information module 210 searches a contacts database stored locally at the electronic device 105. In other embodiments, the information module 210 may retrieve a list of social network connections from a data source 120. Similarly, the information module 210 may identify a business or organization referenced by the caller during the call and known to the call recipient. Where the information module 210 identifies that an individual, business, organization, or other entity referenced by the caller is known to the call recipient, the information module 210 may signal the association module 205, or other components of the verification module 165, in order to receive caller identification data from the referenced entity.

Additionally, the information module 210 may acquire call-related information, such as an incoming phone number, IP address, etc. The information module 210 may provide the call-related data to the comparison module 215 for comparison with expected call-related data (e.g., as gathered by the association module 205). The information module 210 may be embodied as hardware circuitry, software code, and/or a combination of hardware circuitry and software code.

The comparison module 215, in one embodiment, compares the plurality of items of caller identification data with the caller information. In some embodiments, the comparison module 215 identifies caller identification data corresponding to a particular piece of caller information and compares the two in order to verify caller-provided information. For each piece of caller information identified by the information module 210, the comparison module 215 may output to the validation module 220 a positive indication, a neutral indication, or a negative indication, for example, based on the result of comparing the caller information to the caller verification data. The validation module 220 then calculates a confidence score using the positive, neutral, and/or negative indications.

In one embodiment, the comparison module 215 outputs a positive indication where the caller information matches the caller verification data, a negative indication where the caller verification data contradicts and/or refutes the caller information, and a neutral indication where the caller verification data does not match, but also does not refute, the caller information. However, in other embodiments, comparison module 215 may output a positive indication, neutral indication, or negative indication where a degree of match between the caller verification data and the caller information falls within a particular range.

For example, a close match would still result in a positive indication, where differences between the caller verification data and the confirmation are: differences in spelling of a name (individual, business, location, etc.), variations in location and/or location name (e.g., two locations being within a predetermined distance of another may be considered a close match), variations in job title (e.g., the caller may use a more commonly understood job title (e.g., sales associate) in place of an internally used job title (e.g., sales representative), and the like. Still further, the output of the comparison module 215 may not be trinary (e.g., limited to positive, neutral, and negative indications). Rather, the comparison module 215 may output the degree of matching between the caller verification data and the confirmation, for example as a percentage.

In some embodiments, the comparison module 215 provides a single output (e.g., a single indication or degree of matching) for each piece of caller information. In certain embodiments, the association module 205 may identify several pieces of caller identification data corresponding to a single piece of caller information, wherein the comparison module 215 performs several comparisons (e.g., one for each piece of caller identification data), yet only outputs a single indication. For example, the association module 205 may receive a plurality of employment profiles for individuals named "John A. Smith," where "John A. Smith" is the name given by the caller. In this example, the comparison module 215 may compare an occupation, an employer, or other employment details given by the caller (e.g., the caller information) to each of the plurality of profiles associated with the name "John A. Smith."

Where caller identification data from multiple sources is compared to the caller information, the comparison module 215 may output a positive indication where at least one source matches the caller information. Alternatively, the comparison module 215 may require a threshold number of positive matches (or a threshold ratio of positive matches) in order to output a positive indication. Similarly, the comparison module 215 may require a threshold number of negative (or inconclusive) matches in order to output a negative (or neutral) indication. The comparison module 215 may be embodied as hardware circuitry, software code, and/or a combination of hardware circuitry and software code.

The validation module 220, in one embodiment, calculates a confidence score based on the comparison of the plurality of items of caller identification data with the caller information. The validation module 220 also presents, to the call recipient, the confidence score. In one embodiment, the validation module 220 includes a presentation module for presenting the confidence score to the call recipient. For example, the validation module 220 may present the confidence score to the call recipient only (e.g., presenting the confidence score in a manner that does not allow the calling device 110 to receive the confidence score). Presenting the confidence score is discussed in greater detail below with reference to the apparatus 300 of FIG. 3.

The validation module 220 calculates the confidence score based on a degree to which the items of caller identification data match the provided caller information. As discussed above, the comparison module 215 may provide a comparison for each item of caller information recognized by the information module 210, such that the validation module 220 receives a positive indication, neutral indication, negative indication, or other comparison result for each item of caller information. The validation module 220 operates on the comparison data provided by the comparison module 215 to generate the confidence score.

Accordingly, the validation module 220 may improve the confidence score in response to matches between items of the caller identification data and the caller information and worsen the confidence score in response to non-matches between items of the caller identification data and the caller information. In one embodiment, a confidence score with a higher value is better than a confidence score with a lower value. In another embodiment, however, a confidence score with a lower value may be better than a confidence score with a higher value.

In some embodiments, matches between caller information and items of caller identification data corroborated by more than one source improve the confidence score by a greater amount than matches between caller information and uncorroborated caller identification data. For example, a piece of relationship-type caller information corroborated by both a contact of the call recipient and by an additional data source (e.g., social network account/profile) may improve the confidence score by a greater amount than if the relationship-type caller information were corroborated by only one of the contact of the call recipient and the additional data source. Further, where one data source confirms a piece of caller information and another data source refutes the piece of caller information, the validation module 220 may improve the confidence score by a lesser amount (and possibly decrease the confidence score) in situations where only one data source provides caller identification data relating to the piece of caller information.

In certain embodiments, different pieces of caller information are given different weights by the validation module 220 when calculating the confidence score. For example, an incorrect name (e.g., an unverifiable and/or refuted name) may worsen the score by 15% if incorrect, but not affect the score if correct. As another example, a reference to employment may worsen the score by 5% if unverifiable and worsen the score by 10% if refuted (e.g., confirmed incorrect). As another example, name information may be given less weight then relationship information (e.g., where the caller purports to have a relationship with an individual, business, or the entity known to the call recipient). In yet another example, location information may be given less weight than relationship formation.

In one embodiment, the validation module 220 may calculate a confidence score for each item of caller information. In a further embodiment, the validation module 220 may calculate the confidence score using an average (alternatively, a weighted average) of the confidence scores for each item of caller information. In certain embodiments, the validation module 220 may provide a confidence indication based on the confidence score. For example, the confidence indication may designate the caller as "trusted" in response to the confidence score exceeding a predetermined threshold (or alternatively falling within a predetermined range). Similarly, the confidence indication may designate the caller as "untrustworthy" in response to the confidence score being below a threshold value (or alternatively falling within a predetermined range). In certain embodiments, the validation module 220 may automatically terminate the call in response to the confidence score being below a termination threshold value (e.g., below 15%). The validation module 220 may be embodied as hardware circuitry, software code, and/or a combination of hardware circuitry and software code.

In some embodiments, the confidence score is a dynamic value that may be updated throughout the conversation. The validation module 220 may continually update the confidence score as new pieces of caller information are received and validated. For example, the validation module 220 may output an initial confidence score, which may be low, and may prompt the call recipient to ask additional questions. As the caller provides answers to the additional questions, the association module 205 may identify additional caller identification data, the comparison module 215 may perform additional comparisons, and the validation module 220 may update the confidence score based on the caller's responses to the prompted questioning. In one embodiment, the validation module 220 may alert the call recipient whenever the confidence score changes due to additional caller provided information and/or to newly acquired caller identification data.

Figure 3:
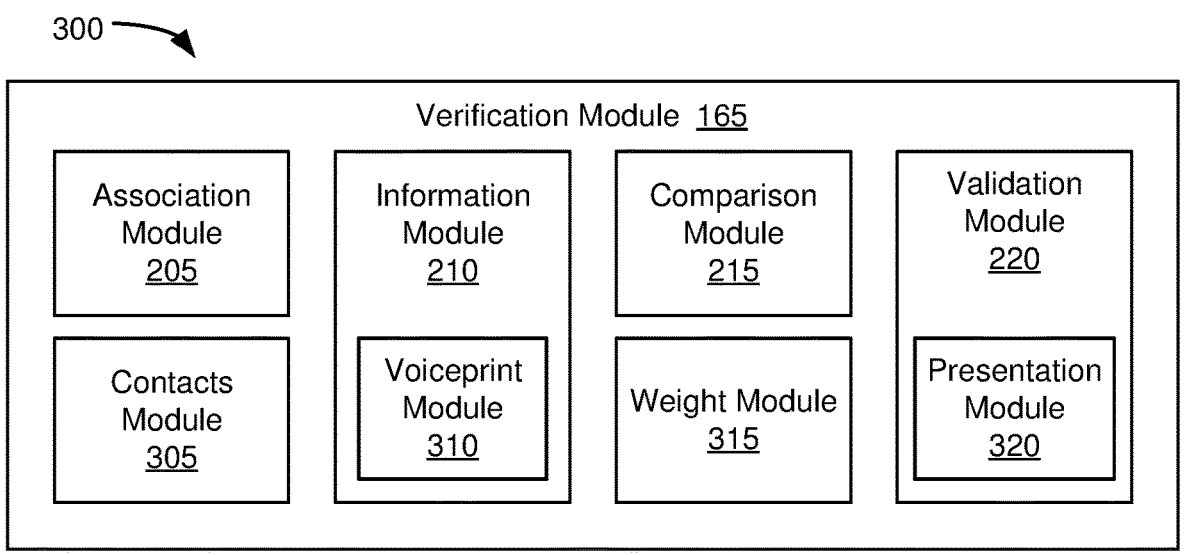
FIG. 3 is a schematic block diagram illustrating another embodiment of an apparatus for validating information provided in a conversation.

FIG. 3 depicts an apparatus 300 for validating information provided in a conversation, according to embodiments of the disclosure. The apparatus 300 includes another embodiment of a verification module 165, which may function substantially similar to verification module 165 described above with reference to FIGS. 1 and 2. In the depicted embodiments, the verification module 165 includes an association module 205, an information module 210, a comparison module 215, and a validation module 220, which may be substantially similar to those described in relation to the apparatus 200 of FIG. 2. In some embodiments, the verification module 165 may also include: a contacts module 305, a voiceprint module 310, a weight module 315, and a presentation module 320, which are described below. The modules 205-220 and 305-320 of the verification module 165 may be communicatively coupled to one another.

In certain embodiments, the modules 205-220 and 305-320 are located within the electronic device 105. In one embodiment, one or more of the modules 205-220 and 305-320 may be physically distributed with some of the module 205-220 and 305-320 being located apart from the electronic device 105. For example, the electronic device 150 may be a telephone handset and one or more of the association module 205, information module 210, comparison module 215, validation module 220, contacts module 305, voiceprint module 310, weight module 315, and presentation module 320 may be located in a server connected to the telephone handset.

The contacts module 305, in one embodiment, queries a device of the identified contact (e.g., the contact device 115) for information regarding the caller and/or the calling device 110. For example, the caller may indicate that she recently spoke with a family member (e.g., a contact) of the call recipient. The information module 210 may identify a reference to the family member, and optionally the context of the reference to the family member (e.g., "caller recently spoke with family member"), and the contacts module 305 may query a device (e.g., smartphone) of the family member to verify call history between the calling device 110 and the family member. Additionally, the validation module 220 calculates the confidence score based on a response to the query. In the above example, the validation module 220 may adjust the confidence score based on whether the device of the family member verifies that the caller recently spoke with the family member.

In some embodiments, the contacts module 305 requests caller identification data from the contact device 115 (e.g., the device of contact referenced by the caller during the call). In one embodiment, the contacts module 305 may request voiceprint data of the caller from the contact device 115. In another embodiment, the contacts module 305 may query the contact device 115 to determine whether the caller and/or the calling device 110 are listed in the contacts database of the contact device 115.

While depicted as a separate component of the verification module 165, in one embodiment, the contacts module 305 may be a subcomponent of the association module 205. The contacts module 305 may be embodied as hardware circuitry, software code, and/or a combination of hardware circuitry and software code.

The voiceprint module 310, in one embodiment, captures voiceprint data of the caller. As used herein, a "voiceprint" refers to a frequency spectrum analysis of the individual's voice, usable to identify the individual. In one example, the voiceprint module 310 may gather information during the call sufficient to generate a voiceprint of the caller. Further, the voiceprint module 310 may store the voiceprint data in memory 160. The voiceprint module 310 may provide the stored voiceprint data, upon request, to an inquiring device included in the user's contacts database. In one embodiment, the query to the contact device 115 for information regarding the caller includes a query for contact-generated voiceprint data of the caller, wherein the comparison module 215 compares the captured voiceprint data with the contact-generated voiceprint data, and wherein the validation module 220 calculates the confidence score based in part on the voiceprint data comparison In some embodiments, the voiceprint data includes a spectrogram of the caller's voice. The association module 205 may query a contact device 115 (or data source 120) to acquire a voiceprint spectrogram generated by a device other than the verification module 165. The comparison module 215 may compare the voiceprint spectrogram generated by the voiceprint module 310 to the acquired voiceprint spectrogram and the validation module 220 may calculate the confidence score based on a degree to which the spectrogram generated by the voiceprint module 310 matches the acquired voiceprint spectrogram.

While depicted as a sub-component of the information module 210, in one embodiment, the voiceprint module 310 may be a separate component of the verification module 165 communicatively coupled to the information module 210, comparison module 215, and/or validation module 220. The voiceprint module 310 may be embodied as hardware circuitry, software code, and/or a combination of hardware circuitry and software code.

The weight module 315, in one embodiment, assigns different weights to different types of caller information. In some embodiments, the weight module 315 may categorize each piece of caller information identified by the information module 210. The weight module 315 may then assign a weight to each piece of caller information based on the category of that piece of caller information. Subsequently, when the validation module 220 calculates the confidence score using each piece of caller information, the validation module 220 may use the assigned weight.

The weight given to each piece of caller information is selected to maximize accuracy of the confidence score by giving greater weight pieces of caller information having greater relevance to the identity of the caller and giving lesser weight to pieces of caller information having less relevance the identity of the caller. For example, the existence of a relationship between the caller and a contact of the call recipient may have greater relevancy to the identity of the caller (and thus given greater weight) than the caller-provided location. Matches between items of caller identification data and caller information with a greater weight improve the confidence score by a greater amount than matches between items of caller identification data and caller information with a lesser weight.

In one embodiment, the weight may be user-definable. In other embodiments, the weight may be defined by a third-party, such as a trusted identity verification organization. While depicted as a separate component of the verification module 165, in one embodiment, the weight module 315 may be a subcomponent of the comparison module 215 and/or validation module 220. The weight module 315 may be embodied as hardware circuitry, software code, and/or a combination of hardware circuitry and software code.

The presentation module 320, in one embodiment, presents, to the call recipient, the confidence score. The presentation module 320 controls the output device 175 to indicate the confidence score to the call recipient. In one embodiment, the presentation module 320 displays one or more icons, glyphs, symbols, etc. to indicate the confidence score. In another embodiment, the presentation module 320 may output an audio message indicating the confidence score. In still another embodiment, the presentation module 320 may use a haptic device to output a vibration or other haptic signal indicating the confidence score. In certain embodiments, the presentation module 320 may use a combination of visual, audio, and/or haptic signals to communicate the confidence score to the call recipient.

In one embodiment, the presentation module 320 presents the confidence score exclusively to the call recipient. Thus, where the presentation module 320 outputs an audio message, the presentation module 320 may output the audio message in a way audible to the call recipient and inaudible to the caller (e.g., not transmitted to the calling device 110). For example, the presentation module 320 may inject the audio message into an incoming audio stream (e.g., an audio stream originating from the calling device 110). In a further example, the presentation module 320 may detect whether a speakerphone is being used to facilitate the call between the calling device 110 and the electronic device 105. In such situations, the presentation module 320 may abstain from presenting the confidence score as an audio message, to avoid transmitting the confidence score to the calling device 110, thereby preserving the exclusivity of the confidence score. In another example, the presentation module 320 may use haptics to communicate the confidence score exclusively to the call recipient. Alternatively, the presentation module 320 may visually present the confidence score in order to preserve exclusivity.

In one embodiment, the presentation module 320 presents a single indicator to communicate the overall confidence score (e.g., the confidence score derived using all pieces of caller information). In another embodiment, the presentation module 320 presents separate indicators for each piece of caller information. In a further embodiment, the presentation module 320 indicates the overall confidence score was simultaneously presenting separate indicators for each piece of caller information. For example, the presentation module 320 may use a specific color, shape, icon, etc. to indicate the overall confidence score while also displaying separate indicators for each piece of caller information verified.

Presenting the confidence score may include using specific colors to communicate the confidence score. As an example, when a higher confidence score indicates a greater level of confidence in the caller's identify, the presentation module 320 may use the color green to indicate a relatively high confidence score (e.g., within an upper range of confidence score values, such as 85% to 100%), the color red to indicate a relatively low confidence score (e.g., within a lower range of confidence score values, such as 0% to 25%), and the color yellow to indicate an intermediate or inconclusive confidence score. Alternatively, the presentation module 320 may communicate the confidence score using numerals (e.g., expressing as a ratio or percentage), a rating (e.g., four out of five stars), via words/text (e.g., displaying "good", "poor", "indeterminate", and the like), or combinations thereof.

In one embodiment, the presentation module 320 may alert the call recipient (e.g., an audio alert, a pop-up window, a pattern of haptic signaling, etc.) in response to the confidence score being below an alert threshold. In a further embodiment, if the confidence score falls below the alert threshold, the presentation module 320 may prompt the call recipient to terminate the call.

While depicted as a sub-component of the validation module 220, in one embodiment, the presentation module 320 may be a separate component of the verification module 165 validation module 220. For example, the presentation module 320 may receive data and/or instructions from the validation module 220, wherein the presentation module 320 controls the output device 175 to present an indication of the confidence score to the call recipient. The presentation module 320 may be embodied as hardware circuitry, software code, and/or a combination of hardware circuitry and software code.

Figure 4:
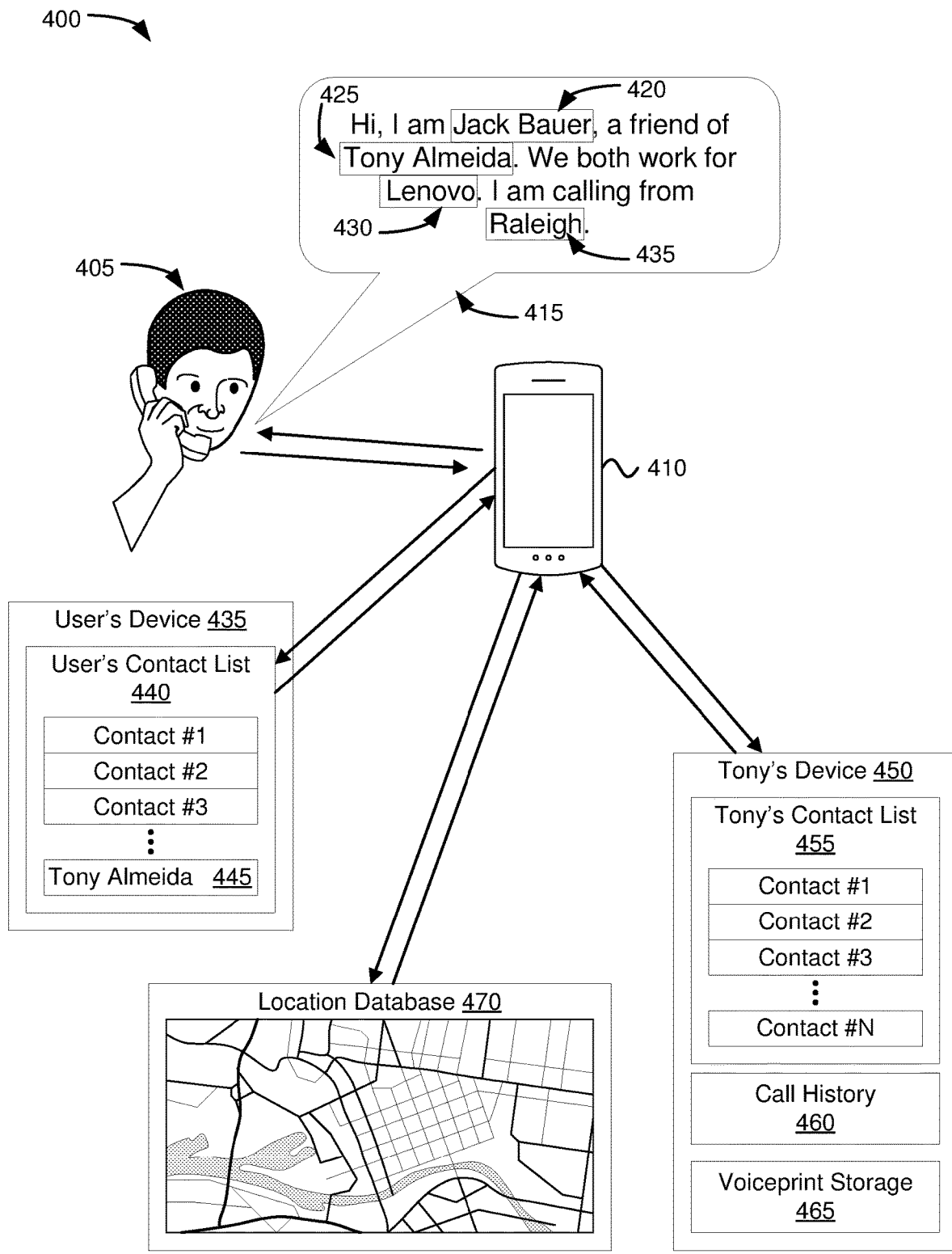
FIG. 4 is a diagram illustrating one embodiment of validating information provided in a conversation.

FIG. 4 depicts a procedure 400 for identifying caller information from speech of a caller 405 and obtaining caller identification data for the caller 405, according to embodiments of the invention. The procedure 400 monitors a call between the caller 405 and the call recipient, placed using the called device 410 belonging to the call recipient. The called device 410 may be one embodiment of the electronic device 105 discussed above with reference to FIGS. 1-3. In one embodiment, the caller 405 uses one embodiment of the calling device 110 to place a call to the called device 410.

In the procedure 400, the caller 405 provides several pieces of caller information. Here a called device 410 recognizes speech 415 of the caller 405 and identifies several pieces of caller information (e.g., items 420-435) from the recognized speech 415. As depicted, identified pieces of caller information include a caller name 420 (e.g., "Jack Bauer"), a mutual acquaintance 425 (e.g., "Tony Almeida"), a named employer 430 (e.g., "Lenovo"), and a calling location 435 (e.g., "Raleigh"). In one embodiment, an information module (e.g., information module 210) located at the called device 410 identifies the pieces of caller information. While FIG. 4 depicts specific types of caller information and a specific number of pieces of caller information, it will be appreciated that any number of pieces of caller information may be provided by the caller 405 during the call and that the types of caller information need not be limited to those depicted in the figure.

In response to the called device 410 identifying the mutual acquaintance 425 referenced by the caller 405 (here "Tony Almeida"), the called device 410 may search the user's contact list 440 for an entry corresponding to the mutual acquaintance 425 (e.g., a contact entry 445 for "Tony Almeida"). In certain embodiments, the called device 410 may confirm that the mutual acquaintance 425 also works for the named employer 430, depending on the context of this information is provided by the caller 405.

Here, the mutual acquaintance 425 is a contact of the call recipient referenced by the caller 405 during the call. Because the mutual acquaintance 425 is listed in the user's contact list 440, the called device 410 may contact a device of the mutual acquaintance 425, here contacting "Tony's device" 450. The called device 410 may then query Tony's device 450 for caller identification data regarding the caller 405.

In one embodiment, the called device 410 determines whether the caller 405 matches an entry in Tony's contact list 455. The called device 410 may provide a caller name 420, a phone number associated with the call, or other information usable by Tony's device 450 to match the caller 405 with an entry in Tony's contact list 455. In another embodiment, the called device 410 may query a call history 460 Tony's device 450 for call records indicating communication between the caller 405 and the mutual acquaintance 425. In further embodiments, the called device 410 may query a voiceprint storage 465 to request voiceprint data generated by Tony's device 450 during a call with the caller 405.

In certain embodiments, the called device 410 queries a location database 470 to verify a calling location 435. The called device 410 may verify that the call originates in the calling location 435. Additionally and/or alternatively, the called device 410 may verify presence of the named employer 430 at the calling location 435. While not shown in FIG. 4, the called device 410 may query an employee database of the named employer 430 to verify that an individual with the caller name 420 works for the named employer 430. Still further, the called device 410 may query an Internet-accessible database for information about individuals having the caller name 420, the named employer 430, or other pieces of caller information.

Figure 5A:
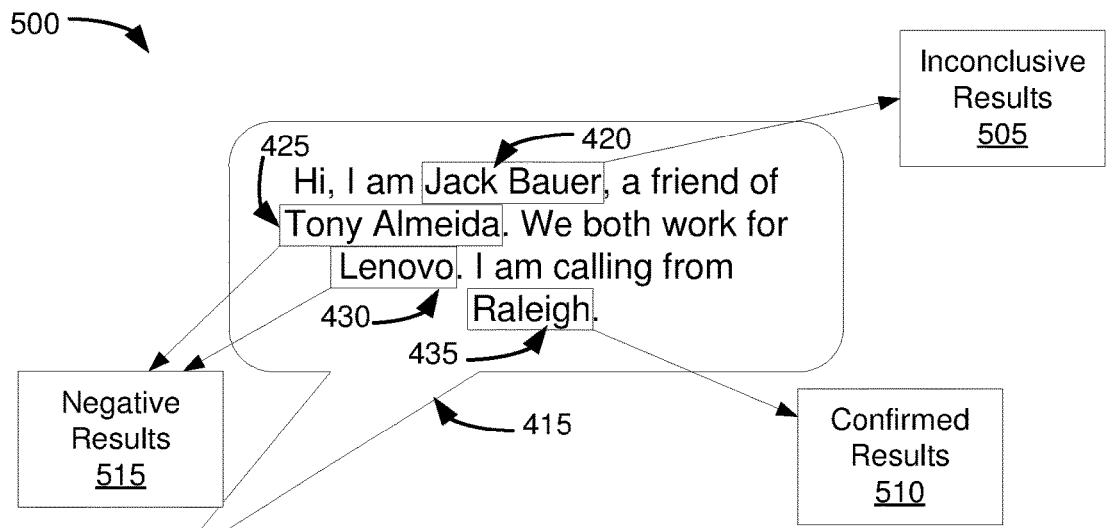
FIG. 5A is a diagram illustrating one embodiment of an analysis of caller information used to validate information provided in a conversation.

FIG. 5A depicts an analysis 500 of the recognized speech 415 during a conversation, according to embodiments of the invention. The recognized speech 415 as discussed above with reference to FIG. 4 and contains multiple pieces of caller information, including a caller name 420 (e.g., "Jack Bauer"), a mutual acquaintance 425 (e.g., "Tony Almeida"), a named employer 430 (e.g., "Lenovo"), and a calling location 435 (e.g., "Raleigh"). As discussed above, an electronic device (e.g., the called device 410) retrieves caller identification data corresponding to the caller information and compares the caller identification data to the caller information.

The depicted analysis 500 includes comparison results for each depicted piece of caller information (e.g., items 420-435). The comparison results include inconclusive results 505, confirmed results 510, and negative results 515. Here, a comparison of the caller name 420 (e.g., "Jack Bauer") gives rise to inconclusive results 505. In one example, the inconclusive results 505 may be due to conflicting information from a plurality of information sources (e.g., information from the contact device 115 may conflict with information from the data source 120). As another example, a search of an employee database may not result in a hit for the name "Jack Bauer," but may include a hit for the name "John Bauer" (noting that "Jack" can be a nickname for "John"). Further, one or more data sources may be unavailable, thus resulting in inconclusive results 505.

The depicted analysis 500 includes confirmed results 510 for the calling location 435. Here, a phone number or IP address associated with the call may correspond to the calling location 435. Additionally, a census of calling location 435 may indicate one or more individuals with the caller name 420 and/or named employer 430 reside at the calling location 435.

However, the analysis 500 depicted in FIG. 5 include negative results 515 for the mutual acquaintance 425 and the named employer 430. For example, a search of the contacts list of "Tony Almeida" (e.g., the mutual acquaintance 425) may not include an entry corresponding to the caller name 420, thus generating a negative result. As another example, a search of an employee database may yield no hits for the caller name 420 and/or the mutual acquaintance 425.

Figure 5B:
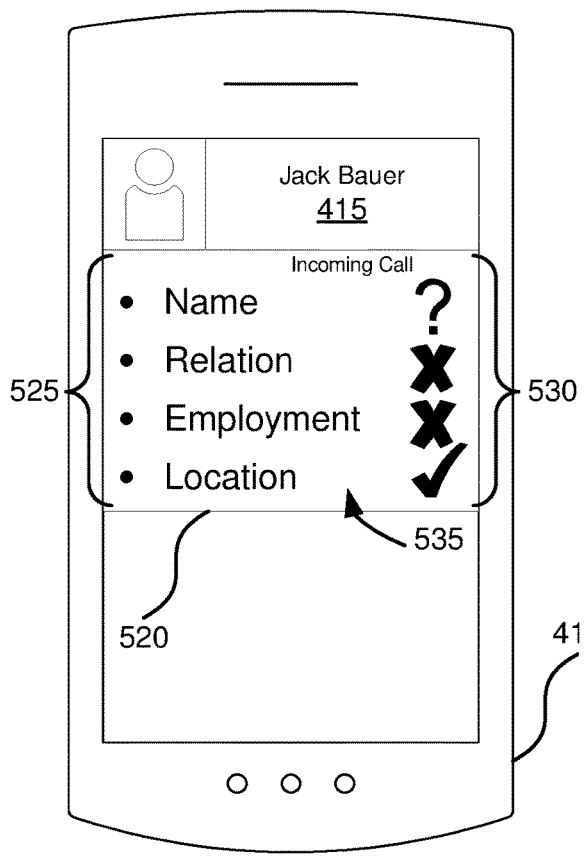
FIG. 5B is a diagram illustrating one embodiment of presenting a confidence score that includes indicators for specific pieces of caller information.

FIG. 5B depicts presenting a confidence score 520 that includes a plurality of individual confidence indicators 530 each for specific pieces of caller information 525, according to embodiments of the invention. The confidence score 520 includes individual entries for multiple pieces of caller information 525, e.g., "name," "relation," "employment," and "location." Here the confidence score 520 includes an individual confidence indicator 530 for each entry in a listing of pieces of caller information. In one embodiment, the individual confidence indicator 530 comprises a glyph or icon communicating a range within which the confidence score falls. As shown, a question mark ("?") is displayed next to the "name" listing because comparison of caller identification data and this piece of caller information 525 resulted in inconclusive results 505. As shown, an "X" is displayed next to the "relationship" listing and the "employment" listing because comparison of caller identification data and these pieces of caller information 525 resulted in negative results 515 as shown, a check mark ("✓") is displayed next to the "location" listing because comparison of caller identification data and this piece of caller information 525 resulted in confirmed results 510.

In some embodiments, the confidence score 520 may also include a background 535 used to indicate an overall confidence score. For example, the color of the background 535 may indicate the overall confidence score while individual confidence indicators 530 show a breakdown of the overall confidence score.

Figure 5C:
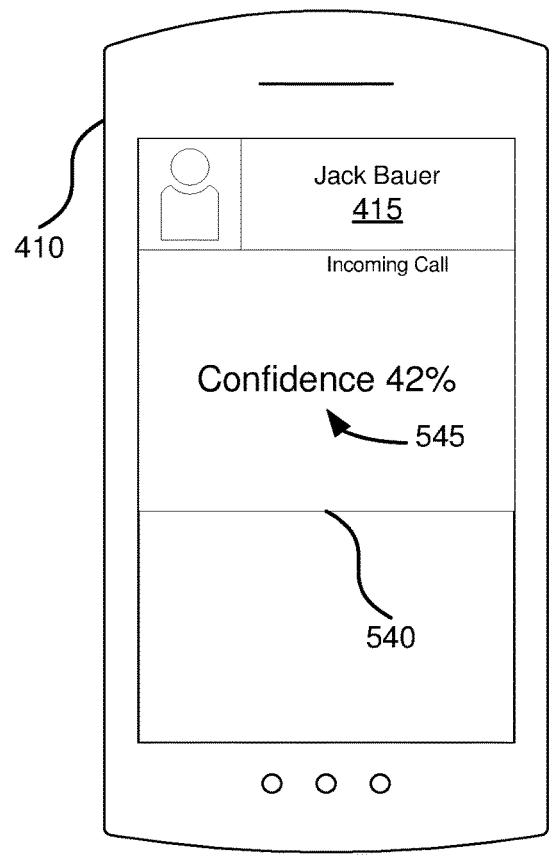
FIG. 5C is a diagram illustrating one embodiment of presenting a confidence score that includes an overall confidence indicator.

FIG. 5C illustrates presenting a confidence score 540 that includes an overall confidence indicator 545, according to embodiments of the invention. The overall confidence indicator 545 may be a weighted average of individual confidence scores for the individual pieces of caller information (e.g., items 420-435). In the depicted embodiment, the overall confidence indicator 545 is expressed as a percentage (here 42%). However, in other embodiments, the overall confidence indicator 545 may be expressed as a rating (e.g., two out of five stars), a level/range (e.g., low trust level), a color (e.g., yellow), and the like. In the embodiment of FIG. 5C the confidence score 540 is a visual indicator. However, in other embodiments the confidence score 540 may be an audible message (e.g., computer generated voice indicating the overall confidence indicator 545 of 42%).

Figure 6:
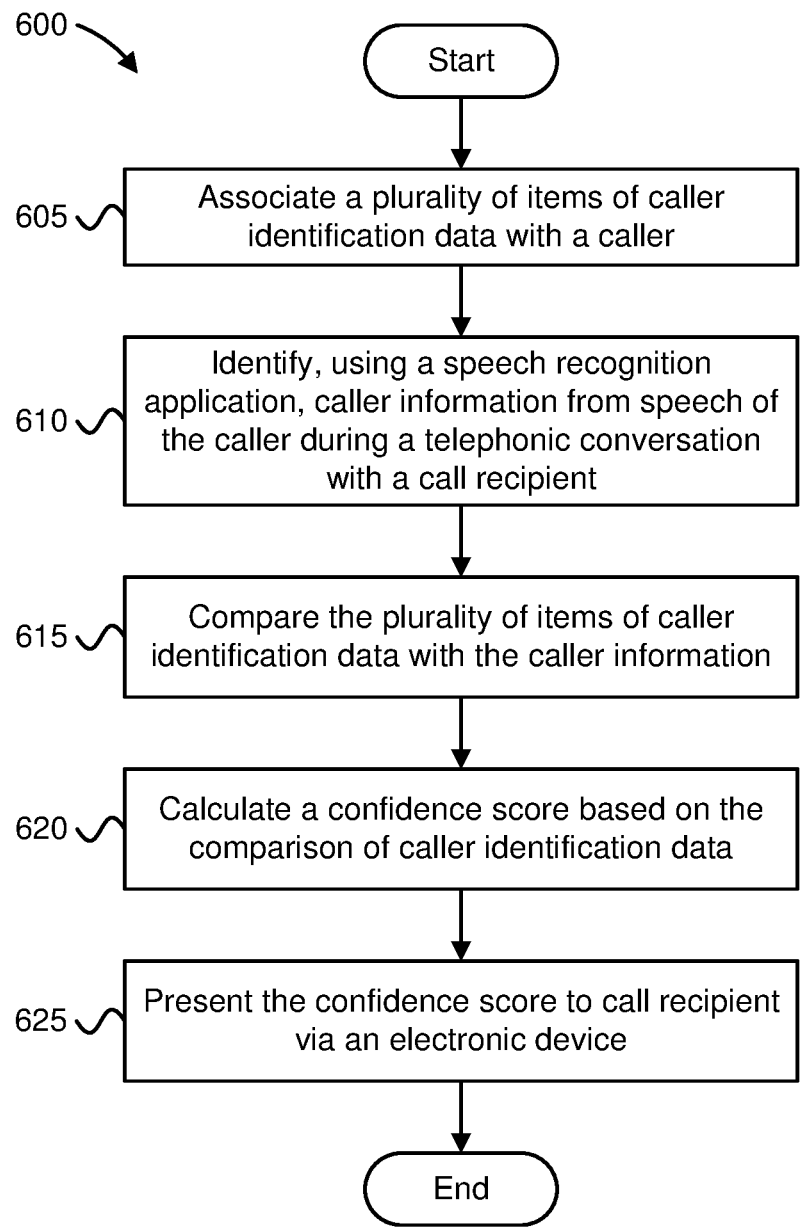
FIG. 6 is a schematic flow chart diagram illustrating one embodiment of a method for validating information provided in a conversation.

FIG. 6 illustrates a method 600 for validating information provided in a conversation, according to embodiments of the disclosure. In some embodiments, the method 600 is performed by a computing device, such as the electronic device 105 described above with reference to FIGS. 1A-1B. In other embodiments, the method 600 may be performed by an apparatus for validating information provided in a conversation, such as the apparatus 200 and/or the apparatus 300 described above with reference to FIGS. 2-3. In certain embodiments, the method 600 may be performed by a processor executing program code, for example, a microcontroller, a microprocessor, a central processing unit ("CPU"), a graphics processing unit ("GPU"), an auxiliary processing unit, a FPGA, or the like.

The method 600 begins and associates 605 a plurality of items of caller identification data with a caller. In one embodiment, the association module 205 associates 605 the plurality of items of caller identification data with the caller 405. In some embodiments, associating 605 the plurality of items of caller identification data include querying a plurality of data sources for caller identification data of the caller, where at least one of the plurality of data sources is independent of data sources controlled by the caller. In certain embodiments, associating 605 the plurality of items of caller identification data with a caller include information from a social network profile the caller and/or searching the Internet to find information regarding the caller.

The method 600 identifies 610 caller information from speech of the caller during a telephonic conversation with the call recipient. Identifying 610 caller information includes using a speech recognition application to identify the caller information from speech of the caller. In one embodiment, the information module 210 identifies 610 caller information from speech the caller, e.g., using the speech recognition application.

The method 600 compares 615 the plurality of items of caller identification data with the caller information. In one embodiment, the comparison module 215 compares 615 the plurality of items caller identification data with the caller information. In some embodiments, the comparison module 215 forms comparison for each piece of caller information.

The method 600 calculates 620 a confidence score based on the comparison of caller identification data and caller information. One embodiment, the validation module 220 calculates 620 the confidence score. In some embodiments, matches between items of the caller identification data in the caller information improve the confidence score while none matches between items of the caller the application and the caller information worsen the confidence score. In certain embodiments, matches between caller information and items of caller identification data corroborated by more than one source improve the confidence score by a greater amount than matches between caller information and uncorroborated caller identification data.

The method 600 presents 625 the confidence score to the call recipient via an electronic device (e.g., the electronic device 105), and the method 600 ends. In another embodiment, the method 600 returns and identifies 610 additional caller information, compares the additional caller information with caller identification data, calculates 620 an updated confidence score and presents 625 the updated confidence score to the call recipient. The method 600 may continue to operate and to update the confidence score during the conversation between the caller and the call recipient. In one embodiment, the validation module 220 and/or the presentation module 320 present 625 the confidence score to the call recipient. In certain embodiments, presenting 625 the confidence score includes providing an indicator for specific pieces of caller information. In some embodiments, presenting 625 the confidence score includes outputting an audio message audible to the call recipient and in audible to the caller.

Figure 7:
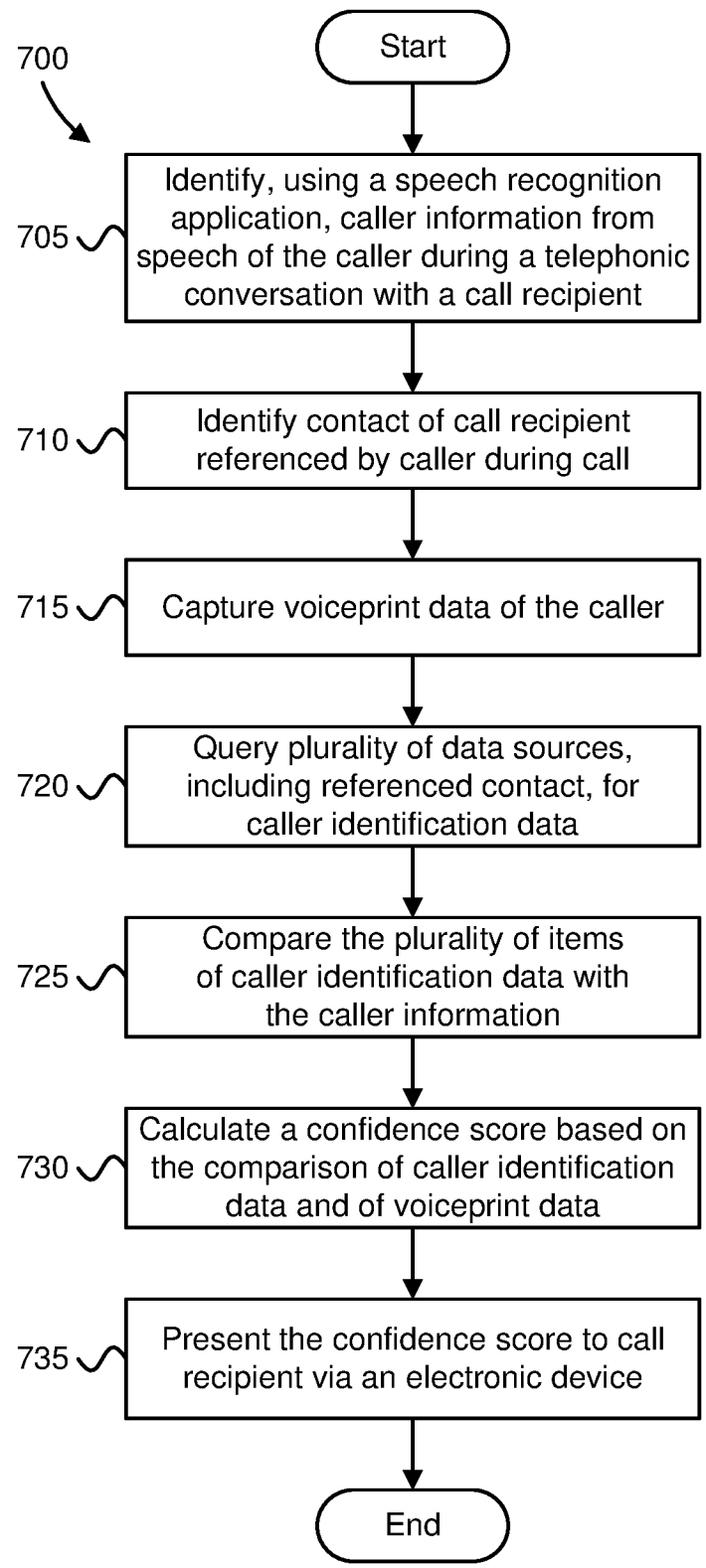
FIG. 7 is a schematic flow chart diagram illustrating another embodiment of a method for validating information provided in a conversation method.

FIG. 7 illustrates a method 700 for validating information provided in a conversation, according to embodiments of the disclosure. In some embodiments, the method 700 is performed by a computing device, such as the electronic device 105 described above with reference to FIGS. 1A-1B. In other embodiments, the method 700 may be performed by an apparatus for validating information provided in a conversation, such as the apparatus 200 and/or the apparatus 300 described above with reference to FIGS. 2-3. In certain embodiments, the method 700 may be performed by a processor executing program code, for example, a microcontroller, a microprocessor, a central processing unit ("CPU"), a graphics processing unit ("GPU"), an auxiliary processing unit, a FPGA, or the like.

The method 700 begins and identifies 705 caller information from speech the caller during a telephonic conversation with the call recipient. Identifying 705 caller information includes using a speech recognition application to identify the caller information from speech of the caller. In one embodiment, the information module 210 identifies 705 caller information from speech of the caller, e.g., using the speech recognition application.

The method 700 identifies 710 a contact of the call recipient referenced by the caller during the call. In one embodiment, the information module 210 identifies 710 contact of the call recipient referenced by the caller during the call. The method 700 also includes capturing 715 voiceprint data of the caller. In one embodiment, the voiceprint module 310 captures 715 the voiceprint data. Capturing 715 the voiceprint data could storing the voiceprint data in memory, such as the memory 160.

The method 700 queries 720 plurality of data sources, including the referenced contact, for caller identification data. In one embodiment, the contacts module 305 queries a device belonging to the referenced contact for caller identification data. In some embodiments, at least one of the plurality of data sources is independent of data sources controlled by the caller. As discussed above, querying 720 the plurality of data sources may include performing Internet search, querying a social network for a social network profile the caller, querying an employee database, and the like. In certain embodiments, querying 720 the referenced contact for caller identification data includes querying for voiceprint data of the caller.

The method 700 compares 725 the plurality of items of caller identification data with the caller information. In one embodiment, the comparison module 215 compares 725 the plurality of items caller identification data with the caller information. In some embodiments, the comparison module 215 forms comparison for each piece of caller information.

The method 700 calculates 730 a confidence score based on the comparison of caller identification data and caller information. One embodiment, the validation module 220 calculates 730 the confidence score. In some embodiments, matches between items of the caller identification data in the caller information improve the confidence score while none matches between items of the caller the application and the caller information worsen the confidence score. In certain embodiments, matches between caller information and items of caller identification data corroborated by more than one source improve the confidence score by a greater amount than matches between caller information and uncorroborated caller identification data.

The method 700 presents 735 the confidence score to the call recipient via an electronic device (e.g., the electronic device 105), and the method 700 ends. In another embodiment, the method 700 returns and identifies 705 additional caller information of the caller and continues through the method 700 to present 735 an updated confidence score to the call recipient. In one embodiment, the validation module 220 and/or the presentation module 320 present 735 the confidence score to the call recipient. In certain embodiments, presenting 735 the confidence score includes providing an indicator for specific pieces of caller information. In some embodiments, presenting 735 the confidence score includes outputting an audio message audible to the call recipient and in audible to the caller.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an association module that associates a plurality of items of caller identification data with a caller, wherein at least a portion of the plurality of items of caller identification data comprises data different than contact information of the caller and at least a portion comprises contact information of the caller;
an information module that identifies, using a speech recognition application, caller information from speech of the caller during a telephonic conversation with a call recipient, wherein identifying caller information using the speech recognition application occurs simultaneously with the caller conversing with the call recipient, the speech recognition application translating speech to text, wherein identifying caller information comprises identifying a contact of a person referenced by the caller during the call, the contact within a list of contacts accessible to the call recipient;
a contacts module that queries a data source associated with the identified contact for information regarding the caller;
a comparison module that compares the plurality of items of caller identification data with the caller information to verify correctness of the caller information; and
a validation module that calculates a confidence score based on the comparison of the plurality of items of caller identification data with the caller information and presents, to the call recipient, the confidence score, wherein matches between the plurality of items of caller identification data with the caller and the caller information improve the confidence score and non-matches between the plurality of items of caller identification data with the caller and the caller information worsen the confidence score, wherein calculating the confidence score is based on a response to the query.

2. The apparatus of claim 1, wherein matches between the plurality of items of caller identification data with the caller and the caller information corroborated by more than one source improve the confidence score by a greater amount than matches between the plurality of items of caller identification data with the caller and the caller information uncorroborated by more than one source.

3. The apparatus of claim 1, further comprising a score weight module that assigns different weights to different types of caller information, wherein matches between the plurality of items of caller identification data and the caller information with a greater weight improves the confidence score by a greater amount than matches between the plurality of items of caller identification data and the caller information with a lesser weight.

4. The apparatus of claim 1, wherein presenting the confidence score to the call recipient comprises outputting an audio message audible to the call recipient and inaudible to the caller.

5. The apparatus of claim 1, wherein presenting the confidence score to the call recipient comprises providing an indicator for specific pieces of the caller information.

6. The apparatus of claim 1, wherein the contacts module queries a device of the identified contact for information regarding the caller.

7. The apparatus of claim 1, further comprising a voiceprint module that captures voiceprint data of the caller, wherein the query for information regarding the caller includes a query for contact-generated voiceprint data of the caller, wherein the comparison module compares the captured voiceprint data with the contact-generated voiceprint data, and wherein the validation module calculates the confidence score based in part on the data comparison of the captured voiceprint data with the contact-generated voiceprint data.

8. The apparatus of claim 1, wherein associating the plurality of items of caller identification data with the caller comprises the association module retrieving information from a social network profile of the caller.

9. The apparatus of claim 1, wherein associating the plurality of items of caller identification data with the caller comprises the association module querying a plurality of data sources for caller identification data of the caller.

10. The apparatus of claim 9, wherein at least one of the plurality of data sources is independent of data sources controlled by the caller.

11. The apparatus of claim 1, wherein the association module searches the internet to identify the plurality of items of caller identification data.

12. The apparatus of claim 1, wherein associating the plurality of items of caller identification data with the caller comprises the association module querying an employee directory of a business identified, using the speech recognition application, from speech of the caller.

13. A method comprising:
associating, by use of a processor, a plurality of items of caller identification data with a caller, wherein at least a portion of the plurality of items of caller identification data comprises data different than contact information of the caller and at least a portion comprises contact information of the caller;
identifying, using a speech recognition application, caller information from speech of the caller during a telephonic conversation with a call recipient, wherein identifying caller information using the speech recognition application occurs simultaneously with the caller conversing with the call recipient, the speech recognition application translating speech to text, wherein identifying caller information comprises identifying a contact of a person referenced by the caller during the call, the contact within a list of contacts accessible to the call recipient;
querying a data source associated with the identified contact for information regarding the caller;
comparing the plurality of items of caller identification data with the caller information to verify correctness of the caller information;
calculating a confidence score based on the comparison of the plurality of items of caller identification data with the caller information, wherein calculating the confidence score is based on a response to the query; and
presenting, to the call recipient via an electronic device, the confidence score, wherein matches between the plurality of items of caller identification data with the caller and the caller information improve the confidence score and non-matches between the plurality of items of caller identification data with the caller and the caller information worsen the confidence score.

14. The method of claim 13, wherein querying a data source associated with the identified contact comprises querying a device of the identified contact for information regarding the caller.

15. The method of claim 13, further comprising:
capturing voiceprint data of the caller, wherein the query for information regarding the caller includes a query for contact-generated voiceprint data of the caller; and
comparing the captured voiceprint data with the contact-generated voiceprint data, wherein calculating the confidence score is further based on the comparison of the captured voiceprint data with the contact-generated voiceprint data.

16. The method of claim 13, wherein associating the plurality of items of caller identification data with the caller comprises querying a plurality of data sources for caller identification data of the caller, wherein at least one of the plurality of data sources is independent of data sources controlled by the caller.

17. A program product comprising a computer readable storage medium that stores code executable by a processor, the executable code comprising code to perform:
associating a plurality of items of caller identification data with a caller, wherein at least a portion of the plurality of items of caller identification data comprises data different than contact information of the caller and at least a portion comprises contact information of the caller;
identifying, using a speech recognition application, caller information from speech of the caller during a telephonic conversation with a call recipient, wherein identifying caller information using the speech recognition application occurs simultaneously with the caller conversing with the call recipient, the speech recognition application translating speech to text, wherein identifying caller information comprises identifying a contact of a person referenced by the caller during the call, the contact within a list of contacts accessible to the call recipient;

querying a data source associated with the identified contact for information regarding the caller;

comparing the plurality of items of caller identification data with the caller information to verify correctness of the caller information;

calculating a confidence score based on the comparison of the plurality of items of caller identification data with the caller information, wherein calculating the confidence score is based on a response to the query; and presenting, to the call recipient via an electronic device, the confidence score, wherein matches between the plurality of items of caller identification data with the caller and the caller information improve the confidence score and non-matches between the plurality of items of caller identification data with the caller and the caller information worsen the confidence score.

18. The program product of claim 17, wherein presenting the confidence score to the call recipient comprises outputting an audio message via the electronic device, the audio message being audible to the call recipient and inaudible to the caller.

* * * * *